(12) United States Patent
Mironov

(10) Patent No.: US 8,932,045 B2
(45) Date of Patent: Jan. 13, 2015

(54) MOULD TURNOVER SYSTEM

(75) Inventor: Gabriel Mironov, Montreal (CA)

(73) Assignee: Suzhou Red Maple Wind Blade Mould Co., Ltd., Jiangsu (CN)

( * ) Notice: Subject to any disclaimer, the term of this patent is extended or adjusted under 35 U.S.C. 154(b) by 185 days.

(21) Appl. No.: 13/394,386

(22) PCT Filed: Sep. 9, 2010

(86) PCT No.: PCT/CN2010/001382
§ 371 (c)(1),
(2), (4) Date: May 11, 2012

(87) PCT Pub. No.: WO2011/029272
PCT Pub. Date: Mar. 17, 2011

(65) Prior Publication Data
US 2012/0219653 A1 Aug. 30, 2012

(30) Foreign Application Priority Data
Sep. 10, 2009 (CN) ...................... 2009 2 0177604 U

(51) Int. Cl.
*B29C 33/26* (2006.01)
*B29C 33/30* (2006.01)
*B29L 31/08* (2006.01)

(52) U.S. Cl.
CPC .............. *B29C 33/26* (2013.01); *B29C 33/305* (2013.01); *B29L 2031/082* (2013.01)
USPC ........................................ 425/451.4; 425/182

(58) Field of Classification Search
CPC .............................. B29C 33/26; B29C 33/305
USPC .......................................................... 425/451.4
See application file for complete search history.

(56) References Cited

U.S. PATENT DOCUMENTS

| | | | |
|---|---|---|---|
| 7,004,736 B2 * | 2/2006 | Krassilnikov | 425/60 |
| 7,223,091 B2 | 5/2007 | Olsen et al. | |
| 2006/0185309 A1 * | 8/2006 | Ness | 52/596 |
| 2009/0145123 A1 * | 6/2009 | Hwang | 60/466 |

FOREIGN PATENT DOCUMENTS

| | | |
|---|---|---|
| CN | 1711162 A | 12/2005 |
| CN | 201128213 Y | 10/2008 |
| CN | 201525098 U | 7/2010 |
| JP | 4077214 A | 3/1992 |
| SU | 672048 A1 | 7/1979 |
| SU | 1646671 A1 | 5/1991 |

OTHER PUBLICATIONS

Dec. 23, 2010 International Search Report and Written Opinion in corresponding Application No. PCT/CN2010/001382.

* cited by examiner

*Primary Examiner* — Yogendra Gupta
*Assistant Examiner* — Alison Hindenlang
(74) *Attorney, Agent, or Firm* — Novak Druce Connolly Bove + Quigg LLP

(57) ABSTRACT

A mold turnover system for turning over the rotating side mold over the fixed side mold includes a turnover device and a quick releasing mechanism, characterized in that the quick releasing mechanism comprises a hook associated with the turnover device and an engaging member associated with the rotating side mold, wherein the hook can be quick engaged onto or disengaged from the engaging member.

20 Claims, 3 Drawing Sheets

MOULD TURNOVER SYSTEM

TECHNICAL FIELD OF THE INVENTION

The present invention relates to a mould turnover system for large moulds composed of a fibre-reinforced resin matrix composite material, particularly suitable for wind turbine blade moulds, which allows convenient and totally automatic disconnection of the mould from the turnover device.

BACKGROUND OF THE INVENTION

For some time there have existed hydraulic and mechanical turnover devices for rotating large composite moulds, particularly wind turbine blade moulds, which usually are a fixed side mould and a turning or rotating side mould. In most cases the turnover device has been connected to the rotating side mould with pins or, in some cases, bolts. When the turnover action is finished and the rotating side mould is turned over to the fixed side mould, it is normally required to remove the pins or bolts to release the mould. Due to the enormity of the moulds, which can exceed 30 tons in weight and 50 meters in length, removing these pins or bolts is frequently difficult, time consuming and somewhat dangerous.

SUMMARY OF THE INVENTION

An aim of the present invention is to overcome the above-mentioned problems and allow fully automatic connection and release of the turning mould to be realized without any manual intervention. The release may be partial or complete. In the case of partial release of the mould, it may be freed to move in slots, rather than being totally disconnected.

The present invention model provides a mould turnover system for turning a rotatable mould over a fixed side mould including a turnover device and a quick releasing mechanism, characterized in that the quick releasing mechanism comprises a hook associated with the turnover device and an engaging member associated with the rotatable mould, wherein the hook can be selectively engaged onto or disengaged from the engaging member.

Preferably, the quick releasing mechanism further includes a driving mechanism for the hook.

Preferably, the driving mechanism is a hydraulic cylinder that is connected to the hook at one end and fixed to the turnover device at the opposite end.

Preferably, the hook is rotated around a pin that is anchored on the turnover device.

Preferably, the engaging member is a shelf welded to the rotatable mould and has a cutout or slot that rides on a pin fixed to the turnover device.

Preferably, the hydraulic cylinder is equipped with a pressure holding valve to prevent accidental releasing.

Preferably, the hook is equipped with one or more proximity sensors, which can be used to signal to a control system whether the hook is engaged or disengaged.

Preferably, the hook is equipped with two proximity sensors.

Preferably, the rotatable mould is provided with further hooks or ears to allow free movement of the rotatable mould in the vertical direction when the hook is disengaged from the engaging member.

This novel design eliminates the labor of inserting or removing pins and ensures efficient and safe production of the large composite parts, especially wind turbine blades.

An aim of this new device is to ensure a robust operation even in cases where the environment is extremely dirty and the possibility of fouling with resin, glue, etc. exists.

BRIEF DESCRIPTION OF THE DRAWINGS

The present invention will now be described in greater detail by way of a non-limiting example and with reference to the accompanying drawings, in which.

DETAILED DESCRIPTION OF THE PREFERRED EMBODIMENTS

Now the turnover device and system according to the present invention will be described with reference to the accompanying drawings, which are only for the illustrative purpose and will not intend to the limit the scope of the present invention.

Figure 1:
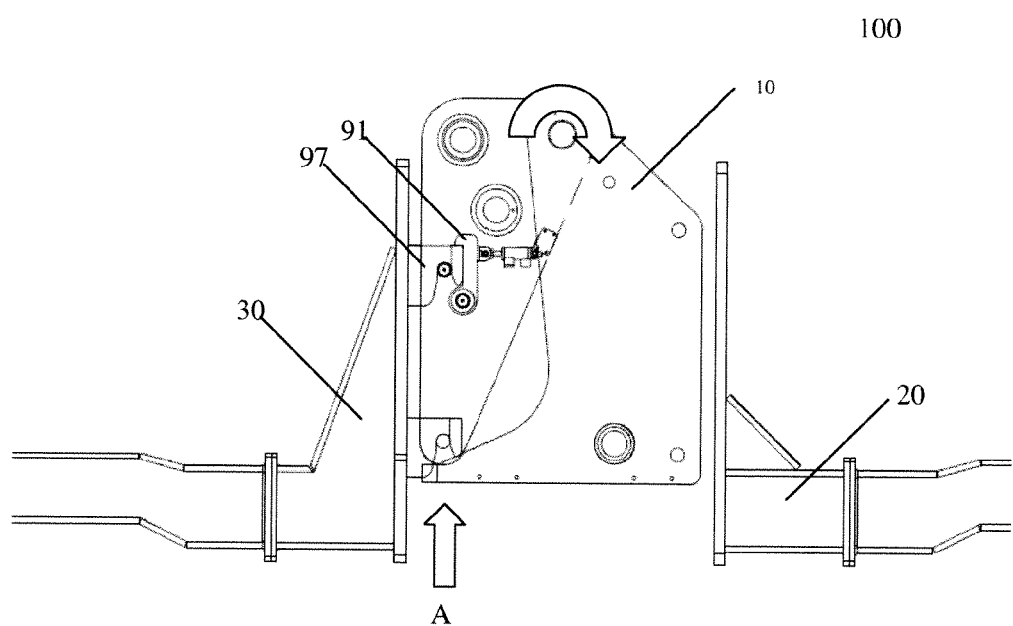
FIG. 1 shows an illustrative view of a mold turnover system according to an embodiment of the present invention.
Figure 2:
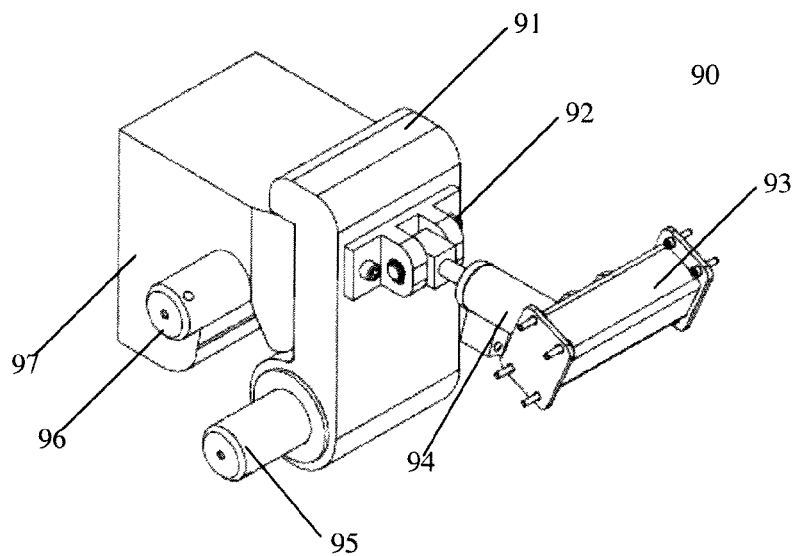
FIG. 2 shows a perspective view of a quick releasing mechanism according to an embodiment of the present invention.
Figure 3:
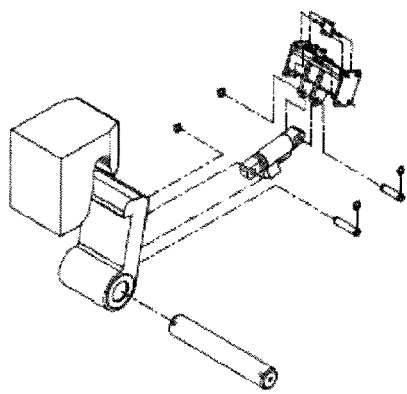
FIG. 3 shows an exploded perspective view of the quick releasing mechanism of FIG. 2.
Figure 4:
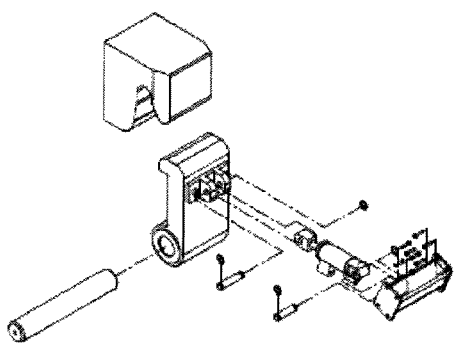
FIG. 4 shows another exploded perspective view of the quick releasing mechanism of FIG. 2.

FIG. 1 shows a mold turnover system 100 for turning a rotating side mould laid on a second attachment frame 30 over a fixed side mould laid on a first attachment frame 20. The mold turnover system 100 generally includes a turnover device 10 and, as shown in FIG. 2, a quick releasing mechanism 90. The quick releasing mechanism 90 connects the second frame 20 for the turning side mould to the turnover device 10 when the mechanism 90 is locked. In this situation, the second frame 30 for the turning side mould can be turned over the first frame 20 for the fixed mould so that two moulds can be clamped together.

With reference to FIG. 2 which illustrates the quick releasing mechanism 90 in a perspective view, the mechanism 90 includes a hook 91, a hydraulic cylinder 94 and a mould attachment shelf 97 which is welded to the second attachment frame 30 for the turning mould. The output member, or piston, of the cylinder 94 is connected to the hook 91 by means of a pivot pin 92 so that the cylinder 94 can drive the hook 91 and the hook 91 can rotate relative to the output member of the cylinder 94. The cylinder 94 is fixed to a cylinder anchor point 93 on the turnover device 10 at its opposite end. The mould attachment shelf 97 is provided with a cutout or slot, which rides on a mould side force carrying pin 96. The pin 96 is fixedly mounted to the turnover device 10. The hook 91 can rotate around a sizeable pivot pin 95, which is anchored on the turnover device 10 by passing through suitable holes or bushings, to adopt a locked position, in which the hook 91 engages onto the shelf 97 or a released position in which the hook 91 is disengaged from the shelf 97 under the drive of the cylinder 94.

It is apparent that the hook 91 can be engaged onto or disengaged from the shelf 97 by means of any other driving mechanism and the cylinder 94 is just one of the examples.

Figure 5:
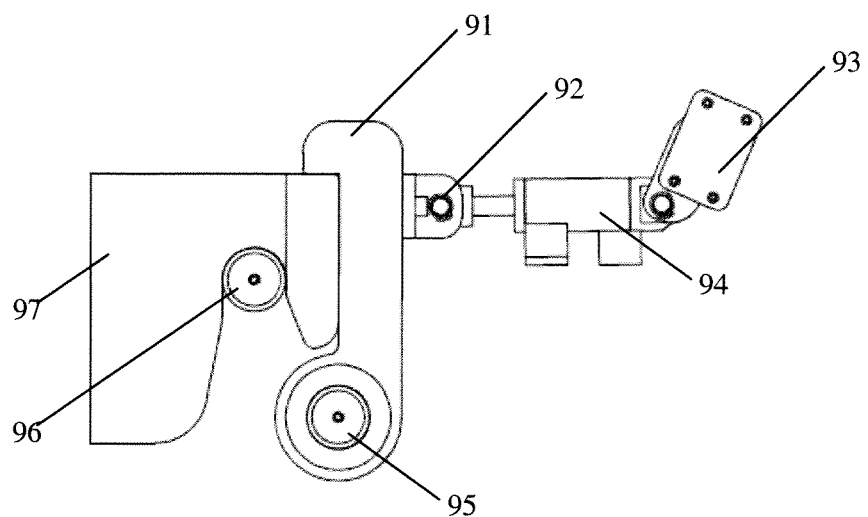
FIG. 5 shows a side view of the quick releasing mechanism of FIG. 2 in a locked position.
Figure 6:
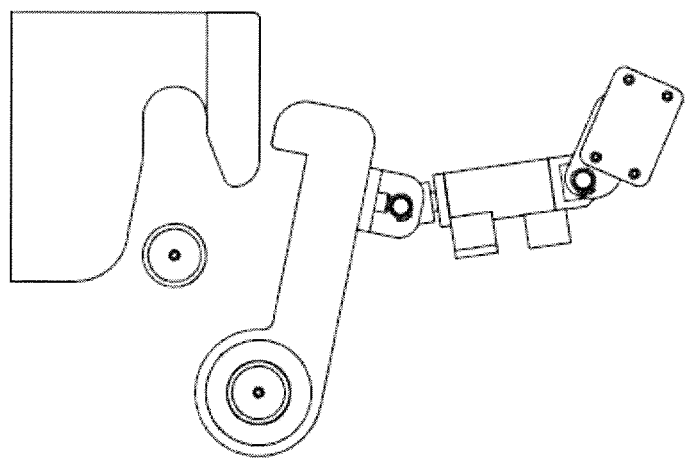
FIG. 6 shows a side view of the quick releasing mechanism of FIG. 2 in a released or opened position.

When the hook 91 is engaged onto the shelf 97, that is, the hook 91 is in the locked position shown in FIG. 1 and FIG. 5; the turnover device 10 can be operated to turn the rotating side mould over the fixed side mould. When the hook 91 is disengaged from the shelf 97, that is, the hook 97 is in the released or opened position shown in FIG. 6, the rotating side mould can be moved vertically in the direction as indicated by the arrow A in FIG. 1 by lifting the hooks or slotted ears provided to the mould.

As can be seen that the connection and/or the release of the rotating side mould can be accomplished by only manipulating the cylinder 94 and it is not necessary for the operator to insert or remove any pins. Therefore, the operation is very simple and easy. Of course, if the cylinder 94 is not provided for saving the cost, the engagement or release of the hook 91 can be accomplished manually.

Preferably, the hydraulic cylinder 94 is equipped with a pressure holding valve to prevent accidental releasing in case of hose breakage or pressure loss.

Preferably, the hook 91 is equipped with one or more proximity sensors, which can be used to signal the control system whether the hook 91 is closed or open. This can be used to prevent operation of the turnover system in case the hook 91 is not properly locked. It is especially preferred to use two proximity sensors in order to ensure a redundant function for higher safety.

A person skilled in the art can contemplate many modifications within the scope of the present invention. For example, the shelf 97 can be replaced by any other members that are fixed to the mould and can be engaged by the hook 91. These modifications all fall in the scope of the present invention defined by the attached claims.

The invention claimed is:

1. An apparatus comprising: a mould turnover system for turning a rotatable mould over a fixed mould, the system comprising a turnover device and a quick releasing mechanism, the quick releasing mechanism comprises a hook associated with the turnover device and an engaging member associated with the rotatable mould, wherein the hook and the engaging member are rotatably moveable with respect to each other for selectively engaging onto or disengaging the hook from the engaging member.

2. The system as recited in claim 1, wherein the quick releasing mechanism further includes a driving mechanism for the hook.

3. The system as recited in claim 2, wherein the driving mechanism is a hydraulic cylinder that is connected to the hook at one end and fixed to the turnover device at the opposite end.

4. The system as recited in claim 3, wherein the hydraulic cylinder is equipped with a pressure holding valve to prevent accidental releasing.

5. The system as recited in claim 1, wherein the hook is rotated around a pin that is anchored on the turnover device.

6. The system as recited in claim 1, wherein the engaging member is a shelf welded to the rotatable mould and has a cutout or slot that rides on a pin fixed to the turnover device.

7. The system as recited in claim 1, wherein the hook is equipped with one or more proximity sensors, which can be used to signal to a control system whether the hook is engaged or disengaged.

8. The system as recited in claim 7, wherein the hook is equipped with two proximity sensors.

9. The system as recited in claim 1, wherein the rotatable mould is provided with further hooks or ears to allow free movement of the rotatable mould in the vertical direction when the hook is disengaged from the engaging member.

10. The system as recited in claim 1 wherein the turnover device and releasing mechanism are disposed between the fixed mould and the rotatable mould, and the fixed mould and the rotatable mould are in a side-by-side relationship.

11. An apparatus comprising:
a rotatable mould mounted to a first frame;
a fixed mould mounted to a second frame that is not connected to the first frame;
a turnover device for turning the rotatable mould, mounted on the first frame, with respect to the fixed mould;
a quick releasing mechanism comprising a hook that is secured to the turnover device and an engaging member that is secured to the rotatable mould; and
wherein the hook and the engagement member are rotatably connected with respect to each other to enable quick connection and quick release of the hook and engaging member.

12. The apparatus of claim 11 wherein the quick releasing mechanism further includes a driving mechanism that is a hydraulic cylinder that is connected to the hook at a distal end and is fixed to the turnover device at a proximal end.

13. The apparatus of claim 11 wherein the hook is rotated around a pin that is anchored on the turnover device.

14. The apparatus of claim 11 wherein the hook is equipped with one or more proximity sensors, which can be used to signal to a control system whether the hook is engaged or disengaged.

15. The apparatus of claim 11 wherein the turnover device and the quick releasing mechanism are disposed between the fixed mould and the rotatable mould, and the fixed mould and the rotatable mould are in a side-by-side relationship when the turnover device is disengaged.

16. An apparatus comprising:
a fixed mould and a rotatable mould disposed in sided-by-side relationship; and
a turnover device having a quick release mechanism for engaging and disengaging the rotatable mould from the fixed mould comprising:
a hook disposed on the turnover device; and
an engaging member disposed on the rotatable mould;
the hook and the engaging member being in rotatable engagement with respect to each other for quick engagement and quick disengagement;
the turnover device configured to move the rotatable mould from the side-by-side relationship into a position over the fixed mould by turning the rotatable mould over the fixed mould when the hook and engaging member are engaged, and allowing free movement of the rotatable mold when the hook and engaging member are disengaged.

17. The apparatus of claim 16 wherein the quick releasing mechanism further includes a driving mechanism that is a hydraulic cylinder that is connected to the hook at a distal end and is fixed to the turnover device at a proximal end.

18. The apparatus of claim 16 wherein the hook is rotated around a pin that is anchored on the turnover device.

19. The apparatus of claim 16 wherein the hook is equipped with one or more proximity sensors, which can be used to signal to a control system whether the hook is engaged or disengaged.

20. The apparatus of claim 16 wherein the rotatable mould are in a side-by-side relationship when the turnover device is disengaged.

* * * * *

UNITED STATES PATENT AND TRADEMARK OFFICE
CERTIFICATE OF CORRECTION

PATENT NO. : 8,932,045 B2  
APPLICATION NO. : 13/394386  
DATED : January 13, 2015  
INVENTOR(S) : Gabriel Mironov It is certified that error appears in the above-identified patent and that said Letters Patent is hereby corrected as shown below:

In the Claims

In column 4, line 34 (claim 16) "sided" should be -- side --.

In column 4, line 62 (claim 20) after "rotatable mould" insert -- and the fixed mould --.

Signed and Sealed this
Twenty-first Day of April, 2015

Michelle K. Lee
*Director of the United States Patent and Trademark Office*